(12) United States Patent
Hartwich et al.

(10) Patent No.: US 10,083,149 B2
(45) Date of Patent: Sep. 25, 2018

(54) METHOD FOR SERIALLY TRANSMITTING A FRAME FROM A TRANSMITTER TO AT LEAST ONE RECEIVER AND PARTICIPANTS OF A BUS SYSTEM VIA A BUS SYSTEM

(71) Applicant: Robert Bosch GmbH, Stuttgart (DE)

(72) Inventors: Florian Hartwich, Reutlingen (DE); Franz Bailer, Moessingen (DE); Arthur Mutter, Neuhausen (DE); Jan Scheuing, Brackenheim (DE)

(73) Assignee: Robert Bosch GmbH, Stuttgart (DE)

(*) Notice: Subject to any disclaimer, the term of this patent is extended or adjusted under 35 U.S.C. 154(b) by 27 days.

(21) Appl. No.: 15/508,292

(22) PCT Filed: Aug. 4, 2015

(86) PCT No.: PCT/EP2015/067932
§ 371 (c)(1),
(2) Date: Mar. 2, 2017

(87) PCT Pub. No.: WO2016/037768
PCT Pub. Date: Mar. 17, 2016

(65) Prior Publication Data
US 2017/0262400 A1    Sep. 14, 2017

(30) Foreign Application Priority Data

Sep. 8, 2014  (DE) .................. 10 2014 217 926
May 20, 2015  (DE) .................. 10 2015 209 196

(51) Int. Cl.
*G06F 13/42* (2006.01)
*H04L 12/40* (2006.01)
(Continued)

(52) U.S. Cl.
CPC ...... *G06F 13/4286* (2013.01); *G06F 13/4022* (2013.01); *H04L 12/40013* (2013.01);
(Continued)

(58) Field of Classification Search
CPC ............. G06F 13/4286; G06F 13/4022; H04L 12/40013; H04L 12/4135; H04L 2012/40125; H04L 2012/40273
(Continued)

(56) References Cited

U.S. PATENT DOCUMENTS 3,982,074 A * 9/1976 Clark ...................... H04J 3/073
                                                                 370/538
5,280,502 A * 1/1994 Niegel .................... H04J 3/076
                                                                 370/505
(Continued)

FOREIGN PATENT DOCUMENTS

DE    10 2011 080 476 A1    2/2013
JP         2002-204231 A      7/2002
JP         2005-278007 A     10/2005

OTHER PUBLICATIONS

International Search Report corresponding to PCT Application No. PCT/EP2015/067932, dated Nov. 25, 2015 (German and English language document) (5 pages).
(Continued)

*Primary Examiner* — Christopher Shin
(74) *Attorney, Agent, or Firm* — Maginot, Moore & Beck LLP

(57) ABSTRACT

The disclosure relates to a method for serially transmitting frames from a transmitter to at least one receiver via a bus line and to a participant station for a bus system. In the method, stuff bits are integrated into the frame by the transmitter dependent on the values of multiple previous bits in order to generate additional signals edges. The transmitter
(Continued)

of the frame counts the stuff bits which are integrated depending on the value of multiple previous bits, and information on the number of counted stuff bits is transmitted in the transmitted frames.

10 Claims, 6 Drawing Sheets

(51) Int. Cl.
*H04L 12/413* (2006.01)
*G06F 13/40* (2006.01)

(52) U.S. Cl.
CPC *H04L 12/4135* (2013.01); *H04L 2012/40215* (2013.01); *H04L 2012/40273* (2013.01)

(58) Field of Classification Search
USPC .......................................... 710/106
See application file for complete search history.

(56) References Cited

U.S. PATENT DOCUMENTS

| | | | |
|---|---|---|---|
| 2004/0114633 A1* | 6/2004 | Mallya | H04J 3/07 370/505 |
| 2005/0210179 A1* | 9/2005 | Walmsley | B41J 2/04505 711/3 |
| 2006/0123176 A1 | 6/2006 | Fredriksson et al. | |
| 2014/0016654 A1* | 1/2014 | Yakashiro | H04L 12/413 370/516 |
| 2014/0201410 A1 | 7/2014 | Hartwich | |
| 2014/0223258 A1 | 8/2014 | Hartwich et al. | |
| 2015/0095711 A1* | 4/2015 | Elend | G06F 11/221 714/39 |
| 2017/0288807 A1* | 10/2017 | Heinebrodt | H04L 1/0008 |
| 2017/0289321 A1* | 10/2017 | Hartwich | H04L 69/324 |

OTHER PUBLICATIONS

Robert Bosch GmbH; CAN with Flexible Data-Rate; Apr. 17, 2012; 32 Pages; Version 1.0; Gerlingen, Germany.

* cited by examiner

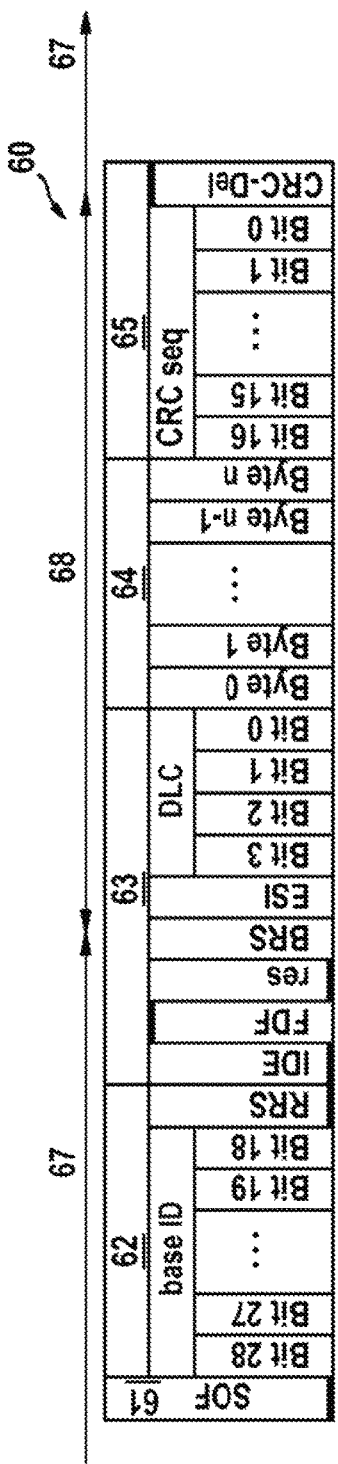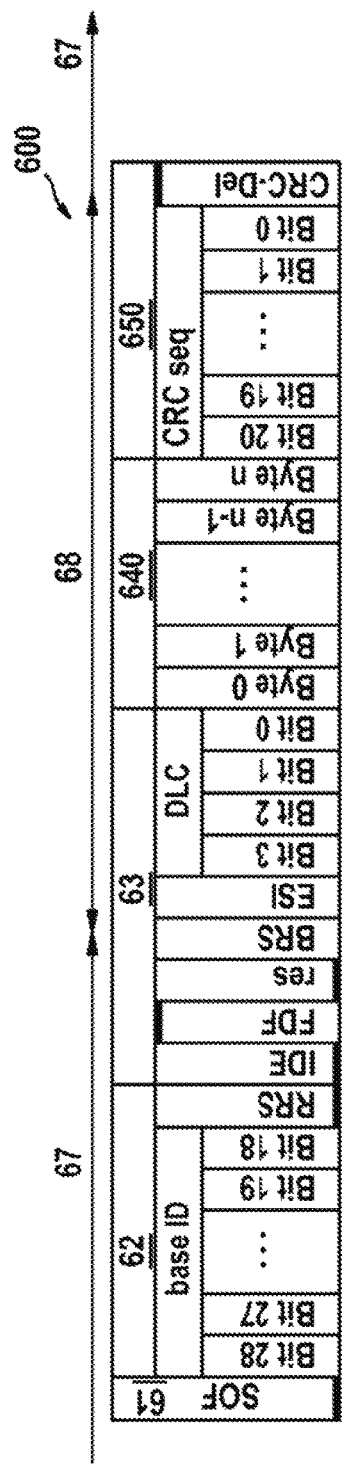

US 10,083,149 B2

METHOD FOR SERIALLY TRANSMITTING A FRAME FROM A TRANSMITTER TO AT LEAST ONE RECEIVER AND PARTICIPANTS OF A BUS SYSTEM VIA A BUS SYSTEM

This application is a 35 U.S.C. § 371 National Stage Application of PCT/EP2015/067932, filed on Aug. 4, 2015, which claims the benefit of priority to Ser. Nos. DE 10 2014 217 926.2 filed on Sep. 8, 2014 and DE 10 2015 209 196.1 filed on May 20, 2015, in Germany, the disclosures of which are incorporated herein by reference in their entirety.

BACKGROUND

For example the CAN bus system can be used for the communication between sensors and control units in vehicles, in particular automobiles. In the CAN bus system, frames are transmitted by means of the CAN protocol and/or CAN FD protocol, as described in the current Committee Draft of the 15011898-1 or the Specification "CAN with Flexible Data-Rate, Specification Version 1.0 (released Apr. 17, 2012)" as the CAN Protocol Specification with CAN FD.

CAN FD frames or messages have, after an initial start-of-frame bit (SOF-bit) with a dominant level which signals the start of the frame, a bit 28 to bit 18 and, if appropriate, also a bit 17 to bit 0 for an identifier or identifiers of the CAN FD frame. Therefore, the bit 28 to bit 0 are also referred to as ID28, ID27 etc.

A weakness has been detected in CRC (Cyclic Redundancy Check) methods of the CAN FD messages or frames. The weakness relates only to CAN FD frames with an identifier which starts with four dominant bits. These four dominant bits together with the dominant start-of-frame bit generate a stuff condition on the basis of which a recessive stuff bit is inserted between the fourth and the fifth identifier bits. This predetermined rule for the insertion of the stuff bits makes it possible to prevent bit sequences with more than five identical bits from being erroneously interpreted as, for example, signaling of an end frame, or prevent the bus users from losing synchronization as a result of the absence of signal edges or level changes between the bits. This is because in the case of CAN and CAN FD, signal edges or level changes are used for the synchronization of the bus users.

If, in the above-mentioned case of the four dominant bits the preceding dominant start-of-frame bit is overwritten (locally in a receiver) with a recessive bit, this receiver interprets the first dominant identifier bit as a start-of-frame bit. There is no stuff condition in the receiver if it receives the recessive stuff bit, with the result that the receiver will accept the recessive stuff bit as the fourth identifier bit. The following bit is accepted as the fifth identifier bit, and the receiver will be in phase again with the transmitter.

The weakness is that in this case the CRC check will not detect the modified fourth identifier bit; a transmitted identifier of, for example, 0x001 is received as 0x081. This occurs if the identifier starts with four dominant "0" bits and the dominant start-of-frame bit is overwritten. The consequence of this will be that the fourth identifier bit is received as "1" instead of as "0". This affects 11-bit identifiers, such as in the base format in the case of CAN FD frames, 29-bit identifiers, such as in the extended format in the case of CAN FD frames, and both CAN FD frames with the 17-bit CRC as well as CAN FD frames with the 21-bit CRC.

The weakness of the CRC method is caused by the initialization vector of "00000000000000000" for the CRC generator. The first leading "0" bit will not modify the CRC generator register, with the result that it is not detected by the CRC check if one bit fewer is present before the first recessive bit in the arbitration field (the transmitted stuff bit which is considered to be the fourth identifier bit by the receiver with the bit error). Furthermore, the absent bit is not detected as a format error at the start of the frame because the stuff bit is accepted as the absent identifier bit.

In summary this means that:

In the case of classic CAN, stuff bits are not taken into account for the CRC generation. Only pairs of bit error-generation/elimination stuff conditions can reduce the Hamming distance (HD) to 2.

In the case of CAN FL) with relatively long CRC checksums (CRC-17 and CRC-21), stuff bits are included by the CRC generation. A problem can arise if the receiver falsifies the start-of-frame bit.

In the following two cases, the CRC of the CAN FD frame may not detect a falsified identifier. This means that the receiver accepts the falsified frame as a valid frame.

Case 1a: Transmitter Transmits ID28-ID25="0000"

If the receivers detects a shortened start-of-frame bit, identifiers which start with ID28-ID25="0000" can be falsified as ID28-ID25="0001". The reason for this is that the receiver does not detect the start-of-frame or detects it too late and therefore interprets ID28 as a start-of-frame. Therefore, the first four identifier bits are falsified to ID28-ID25="0001" owing to the stuff bit which is inserted after ID25 by the transmitter, and all the subsequent identifier bits are received correctly. The transmitter does not detect an error when the start-of-frame is read hack by the bus.

The necessary shortening depends on the CAN clock frequency relationship between the transmitter and the receiver. Refer to the examples for details.

The falsified bus signal can contain dominant interference pulses as long as they are not detected by the receiving CAN nodes. The falsified bus signal can contain recessive interference pulses as long as the bit before the start-of-frame bit which was transmitted by the transmitter is sampled in a dominant fashion by the receiving CAN node. This is explained in more detail below with reference to FIG. 7 and FIG. 8.

If, for example, the CAN clock in the user stations or nodes is fRX_node==fTX_node, shortening/falsification of the start-of-frame bit of "phase_seg2+ε" is sufficient to cause the problem. With 1 Mbit/s and a sample point (SP) of 80%, shortening by 205 ns is sufficient to generate the problem. This will be explained in more detail below with reference to FIG. 7 and FIG. 8.

Case 1b: Transmitter Transmits ID28-ID25="0001"

If, on the other hand, the receiver detects, e.g. by means of a dominant interference pulse, a dominant bit: in the bit time before the transmitted start-of-frame bit arrives, identifiers which start with ID28-ID25="0001" can be falsified to ID28-ID25="0000". The reason for this is that the receiver recognizes the start-of-frame bit transmitted by the transmitter as ID28. As a result, the receiver misinterprets the "1" as a stuff bit and removes it. Therefore, the first four identifier bits are falsified to ID28-ID25="0000". All the subsequent identifier bits are received correctly.

In summary, table 1 shows how the critical values of the identifier bits ID28 to ID25 have to be falsified from "0000" and "0001" on the way to the receiver so that the error is not recognized by the CRC of the receiver.

TABLE 1

| Transmitted | | | | | Received | | | |
|---|---|---|---|---|---|---|---|---|
| ID28 | ID27 | ID26 | ID25 | | ID28 | ID27 | ID26 | ID25 |
| 0 | 0 | 0 | 0 | → | 0 | 0 | 0 | 1 |
| 0 | 0 | 0 | 1 | → | 0 | 0 | 0 | 0 |

The same problem can also occur within a CAN FD frame if a sequence of four or five dominant bits start at the position within a frame when all the bits of the CRC generator register are at zero. In other words, a comparable problem can also arise within a CAN FD frame if a recessive bit, after a sequence of four transmitted dominant bits, is misinterpreted as a stuff bit by the receiver owing to shortening of a bit or shifting in the synchronization along the users, and at the same time the intermediate-CRC register value happens to be equal to "0 . . . 0". The intermediate-CRC register value is the value of the CRC checksum which is present in each case in the CRC register provided for that purpose. The content of the CRC register is newly calculated in accordance with the rule of the respectively used CRC polynomial with each bit in the transmitter or receiver which is transmitted or received before the CRC field. The content of the register which is present at the last bit of the data field is then sent by the transmitter to the receiver in the CRC field of frame for checking.

Classic CAN frames are not affected since the stuff bits are extracted from CRC calculation there.

Patent Application DE102011080476A1 discloses a method in which the transmitter inserts fixed stuff bit sequences composed of one or more bits into the frame, at least in parts of the frame. The first inserted bit of the fixed stuff bit sequence (or the individual inserted fixed stuff bit) preferably has a value which is inverse with respect to the preceding bit. The fixed stuff bit sequences (or fixed stuff bits) occur at predefined positions of the frame. In contrast to this, in the classic CAN, the stuff bits are inserted as a function of the values of a plurality of preceding bits and therefore have no fixed positions.

SUMMARY

The object of the present disclosure is therefore to make available a method for serially transmitting a frame from a transmitter to at least one receiver via a bus system and a user station for a bus system, which method and which user station solve the abovementioned problems. In particular, a method for serially transmitting a frame from a transmitter to at least one receiver via a bus system and a user station for a bus system are made available in which the reliability of the transmission of data between users of a bus system is increased further compared to previous methods.

The object is achieved by means of a method for serially transmitting a frame from a transmitter to at least one receiver via a bus line having the features according to the disclosure. In the method, stuff bits for generating additional signal edges are inserted into the frames by the transmitter, as a function of the values of a plurality of preceding bits, wherein the transmitter of the frame counts the stuff bits which are inserted as a function of the values of a plurality of preceding bits, and wherein information about the number of counted stuff bits is also transmitted in the transmitted frame. The method makes available a possible way of recognizing that a bit error has occurred such as is described in the prior art and which therefore cannot be revealed by the CRC procedure.

In the method, in the case of CAN FD implementations, stuff bits are counted, the counter reading is transmitted in the frame and subsequently checked by the receiver.

The advantage of this method is that the recognized weakness of the CRC procedure is compensated by an additional checking method. This method has, in contrast to other proposed solutions, only minimal effects on the useful data rate.

The use of the described method can be verified by means of the data sheet/manual of the CAN protocol controller, on the one hand, and on the other hand by means of the behavior of the controller or the communication control device in the network or bus system. The CAN FD protocol variant described here is to be used for CAN and for TTCAN networks.

Advantageous further refinements of the method are specified in the embodiments of the disclosure.

It is possible that, in addition to the information about the number of counted stuff bits, further protection information relating to the counted number of stuff bit is also transmitted in the transmitted frame.

The receiver of the frame can count the stuff bits as a function of the values of a plurality of preceding bits and compare them with the information which is also transmitted about the number of counted stuff bits in the transmitted frame, and the receiver can reject the received frame if the stuff bits counted by the receiver in the received frame are unequal to the information about the number of counted stuff bits which is also transmitted in the transmitted frame.

Stuff bits are preferably inserted in a first part at the frame as a function of the values of a plurality of preceding bits, wherein stuff bits can be inserted in a second part of the frame as fixed stuff bits at defined positions, wherein the transmitter of the frame counts the stuff bits which are located before the region in which switching over to the fixed stuff bit method takes place, and wherein information about the number of counted stuff bits is also transmitted in the transmitted frame.

The frame possibly has a header part, a data part and an end part, wherein the header part comprises an identifier, wherein the frame comprises a CRC checksum, and wherein the information about the number of counted stuff bits is also transmitted in the end part of the transmitted frame before the CRC checksum.

The information about the number of counted stuff bits can preferably also be included in the calculation of the CRC checksum.

In one specific refinement of the method, a fixed stuff bit can be inserted between the information about the number of counted stuff hits and the CRC checksum, which fixed stuff bit contains, as a parity bit, protection information about the number of counted stuff bits.

In a further specific refinement of the method, a 3-bit counter is used for counting the stuff bits.

The above-mentioned object is additionally achieved by a user station for a bus system according to the disclosure. The user station comprises a transceiver device for transmitting a frame to and/or receiving a frame from one other user station of the bus system, with which the frame can be transmitted by means of serial transmission from a transmitter to at least one receiver via a bus line, and a protection device for protecting a number of stuff bits which are inserted into the frame, wherein the transceiver device is configured to insert into a frame, before the transmission of said frame, stuff bits, according to a predetermined rule, for generating additional signal edges, as a function of the values of a plurality of preceding bits and/or to remove the stuff bits again when a received frame is evaluated, and wherein the protection device is configured to count the stuff bits which are inserted as a function of the values of a plurality of preceding bits and to insert information about the number of counted stuff bits into the frame, with the result that information is also transmitted in the transmitted frame.

The user station can be part of a bus station which additionally has a bus line and at least two user stations which can be connected to one another via the bus line in such a way that they can communicate with one another, wherein at least one of the at least two user stations is the previously described user station.

Further possible implementations of the disclosure also comprise non-explicitly mentioned combinations of features or embodiments which have been described above or below with respect to the exemplary embodiments. In this context, a person skilled in the art will also add individual aspects as improvements or additions to the respective basic form of the disclosure.

BRIEF DESCRIPTION OF THE DRAWINGS

The disclosure is described in more detail below with reference to the appended drawing and on the basis of exemplary embodiments. In the drawing:

FIGS. 3 to 6 each show the format of CAN FD frames with the positioning of the first four identifier bits (ID28-ID25) according to the current Committee Draft of ISO 11898-1;

Identical or functionally identical elements in the figures are provided with the same reference symbols unless stated otherwise.

DETAILED DESCRIPTION

Figure 1:
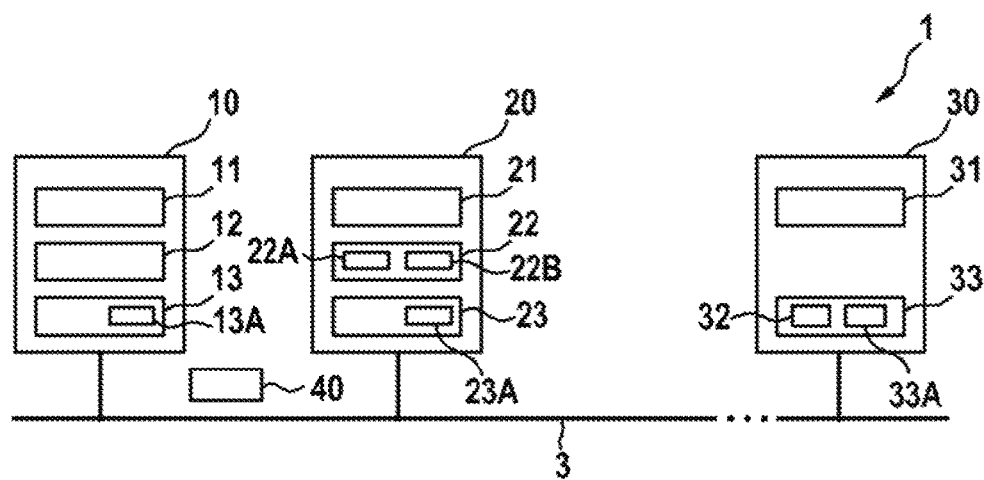
FIG. 1 shows a simplified block circuit diagram of a bus system according to a first exemplary embodiment.

FIG. 1 shows, in a first exemplary embodiment, a bus system 1 which can be, for example, a CAN FD bus system. The bus system 1 can be used in a vehicle, in particular a motor vehicle, an aircraft etc. or in a hospital etc.

In FIG. 1, the bus system 1 has a bus line 3 to which a multiplicity of user stations 10, 20, 30 are connected. Frames 40 in the form of signals can be transmitted between the individual user stations 10, 20, 30 via the bus line 3. The user stations 10, 20, 30 can be, for example, control units, sensors, display devices, etc. of a motor vehicle or else industrial control systems.

As shown in FIG. 1, the user station 10 has a communication control device 11, a protection device 12 and a transceiver device 13 which has a CRC generator 13A. Of course, the protection device 12 can also be part of the communication control device 11. The user station 20 has, in contrast, a communication control device 21, a protection device 22 with a CRC evaluation unit 22A and an insertion unit 22B, and a transceiver device 23 which has a CRC generator 23A. The user station 30 has a communication control device 31, a protection device 32 and a transceiver device 33 which has the protection device 32 and a CRC generator 33A. The transceiver devices 13, 23, 33 of the user stations 10, 20, 30 are each connected directly to the bus line 3 even if this is not illustrated in FIG. 1.

The communication control devices 11, 21, 31 each serve to control a communication of the respective user station 10, 20, 30 via the bus line 3 with another user station of the user stations 10, 20, 30 connected to the bus line 3. The communication control devices 11, 21, 31 can each be embodied as a conventional CAN or TTCAN or CAN FD controller. The communication control devices 11, 21, 31 can each also be embodied as a part of a microcontroller which is also included in the respective user station 10, 20, 30. The transceiver devices 13, 23, 33 can each be embodied as a conventional CAN or TTCAN or CAN FD transceiver.

The protection devices 12, 22, 32 can also be embodied as software modules which form part of the software which runs in the user station. In this case, the method according to the present disclosure is implemented completely in the form of software.

Figure 2:
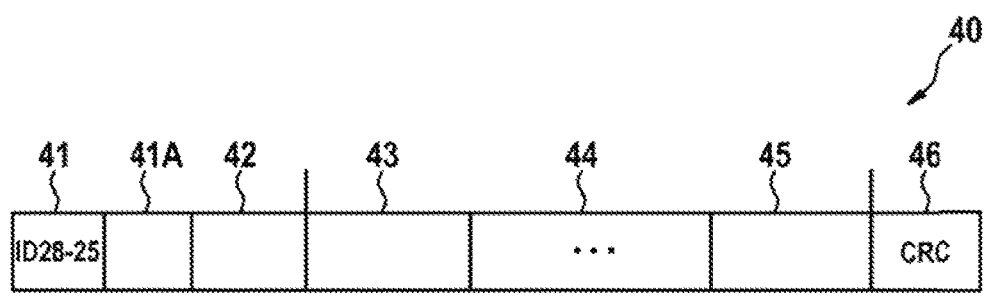
FIG. 2 shows a schematic illustration of a structure of a frame in the bus system according to FIG. 1.

FIG. 2 shows a very schematic view of the structure of of frame 40 without the start-of-frame bit (SOF) which is transmitted directly before the frame 40 via the bus line 3. The frame 40 can be a CAN frame or a TTCAN frame.

In FIG. 2, the frame 40 has a header part 41, 41A, 42, a data field 43, 44, 45 and an end part 46 which forms the frame end. The header part 41, 51A, 42 has the first four bits of the identifier (ID) 41, 41A, in a first partial section 41, the other bits of the identifier 41, 41A in a second partial section 41A, and a control field 42. The data field 43, 44, 45 has a byte 0 in a first part 43, further bytes in a second part 44, and a byte n in a third part 45. A CRC checksum is provided in the end part 46.

FIG. 3 shows a frame 60 which is transmitted by one of the user stations 10, 20, 30 and has up to 16 data bytes in the CAN FD base format. The frame 60 has an SOF bit 61 and a plurality of frame fields such as an arbitration field 62, a control field 63, a data field 64 and a checksum field (CRC field) 65. The arbitration field 62 comprises an identifier of the frame 60 in the base-ID field. A RRS bit is arranged at the end of the arbitration field 62. The control field 63 starts with an IDE bit which is followed by an FDF bit and then by an RES bit and adjoining BRS bit and then ESI bit, which is adjoined by a DLC field. The data field 64 is not present if the DLC field of the control field 63 has the value 0. The checksum field 65 contains a CRC checksum in a CRC-seq field and ends with an adjoining CRC delimiter CRC-del. The specified fields and bits are known from the ISO-CD-11898-1 and are therefore not described in more detail here.

In FIG. 3, the length of an arbitration phase 67 is specified in the present exemplary embodiment. The arbitration phase 67 is adjoined by the data phase 68 if the BRS bit in the frame 60 is recessive. The frame 60 has a header part 61 to 63, a data part 64 and an end part 65.

FIG. 3 to FIG. 6 illustrate dominant bits with a wide line at the lower edge of the frame 60. Recessive bits are illustrated in FIG. 3 to FIG. 6 with a broad line at the upper edge of the frame 60.

As is shown in FIG. 3, the associated communication control device 11, 21, 31 of the transmitter produces the frame 60 in such a way that the SOF bit, the RRS bit, the IDE bit and the res-bit are dominant, while the FDF bit and the CRC delimiter CRC-Del are recessive.

FIG. 4 shows a frame 600 which is transmitted by one of the user stations 10, 20, 30 and has more than 16 data bytes in the CAN FD base format. The frame 600 is structured in the same way as the frame 60 in FIG. 3 with the exception of a data field 640 which is longer compared to the data field 64 and a checksum field 650 which is longer compared to the checksum field 65. The frame 600 has a header part 61 to 63, a data part 640 and an end part 650.

Figure 5:
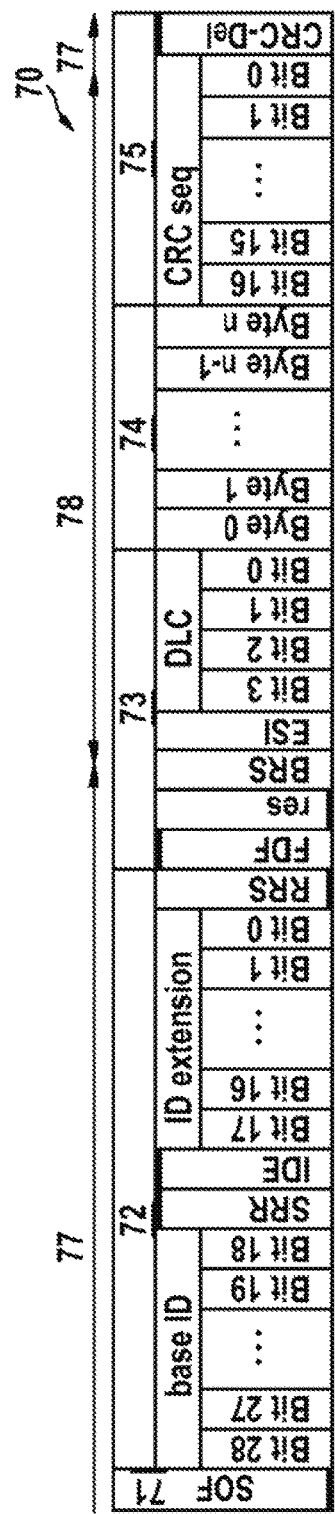

FIG. 5 shows a frame 70 which is transmitted by one of the user stations 10, 20, 30 and has up to 16 data bytes in the CAN FD extended format. According to FIG. 5, the frame 70 has an SOF bit 71 as well as a plurality of frame fields such as an arbitration field 72, a control field 73, a data field 74 and a checksum field (CRC field) 75. The arbitration field 72 comprises in the base ID field and the ID-ext field an identifier of the frame 70. An SRR bit and an IDE bit are provided between the base ID field and the ID-ext field. An RRS bit is arranged at the end of the arbitration field 72. The control field 73 starts with an FDF bit, followed by an res bit. This is followed by an BRS bit and an ESI bit. The control field 73 ends with the DLC field. The data field 74 is not present if the DLC field of the control field 73 has the value 0. Otherwise, the frame 70 is structured in the same way as the frame 60 of FIG. 3 and has a corresponding arbitration phase 77 and data phase 78. The frame 70 has a header part 71 to 73, a data part 74 and an end part 75.

As shown in. FIG. 5, the associated communication control device 11, 21, 31 of the transmitter produces the frame 70 in such a way that the SOF bit, the RRS bit and the res bit are dominant, while the SRR bit, the IDE bit and the CRC delimiter CRC-Del are recessive.

Figure 6:
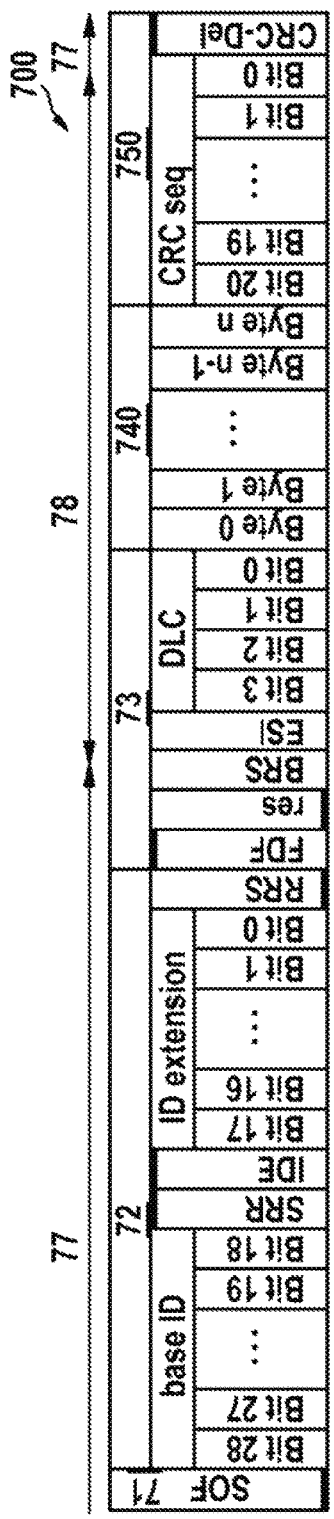

FIG. 6 shows a frame 700 which is transmitted by one of the user stations 10, 20, 30 and has more than 16 data bytes in the CAN FD extended format. The frame 700 is structured in the same way as the frame 70 in FIG. 5 with the exception of a data field 740 which is longer compared to the data field 74 and a checksum field 750 which is longer compared to the checksum field 75. The frame 700 has a header part 71 to 73, a data part 740 and an end part 750.

The CRC checksum is referred to as CRC 17 for CAN FD frames 60, 600 in the base format, shown in FIG. 3 and FIG. 4. The CRC checksum is referred to as CRC-21 for CAN FD frames 70, 700 in the extended format, shown in FIG. 5 and FIG. 6.

Figure 7:
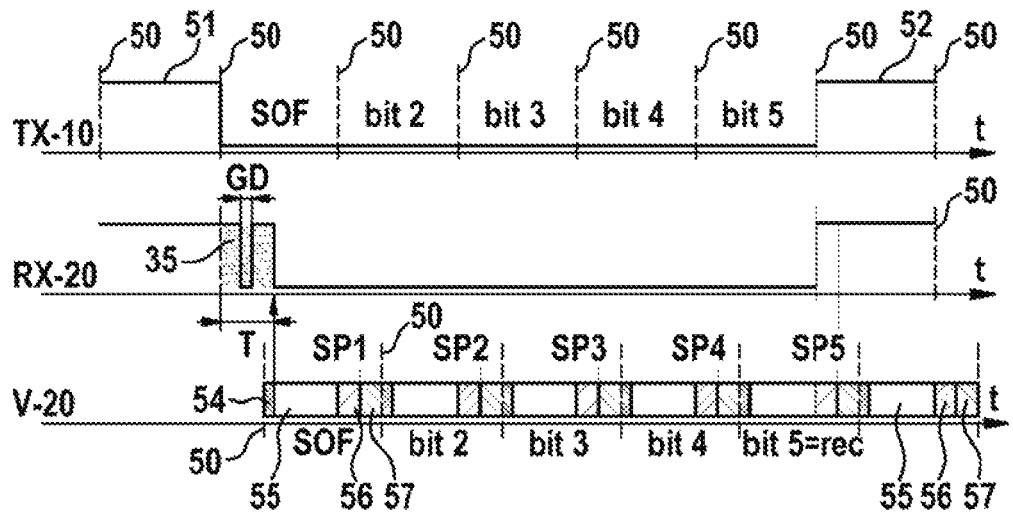
FIG. 7 and FIG. 8 each show a time profile diagram illustrating the clock ratios between the transmitter and receiver at the start of a transmitted frame in the bus system according to FIG. 1.

FIG. 7 shows as an example the profiles of the transmission signal TX-10 of the user station 10, of the reception signal RX-20 of the user station 20, and the sampling view V-20 of the user station 20 in each case against the time t. The dashed line in FIG. 7 indicates in each case the bit limit 50 between individual bits. For reasons of clear illustration, not all the dashed lines for the bit limit 50 are provided with a reference symbol for the reception signal RX-20 and the sampling view V-20.

FIG. 7 shows the case in which firstly an idle bit 51 is transmitted on the bus line 3 before the transmission signal TX-10 starts with a start-of-frame bit (SOF bit). This is followed by a bit2 to bit5 with the same level as the start-of--frame bit. After the bit5, a stuff bit 52 is inserted.

This results in the reception signal RX-20 corresponding to the transmission signal TX-10 with a delay (not illustrated) which arises owing to the transmission of the transmission signal TX-10 via the bus line 3. This reception signal RX-20 can have a recessive level for various reasons (hardware errors, external interference, electromagnetic irradiation, etc.) for a time period T, even though the transmission signal has a dominant level of the SOF bit. In the reception signal RX-20 which is falsified in this way, a short, dominant interference pulses GD may also be present which further falsify the bus signal 35, as shown in FIG. 7. Such interference pulses GD can also arise, for example, owing to external interference, in particular electromagnetic irradiation etc., and are possibly not detected by the receiving user station, that is to say here the user station 20, for example if they are shorter than the shortest bus time unit of one time quantum tq. The reception signal RX-20 remains falsified.

The user station 20 sees the signal V-20 owing to the falsified reception signal RX-20. After the bit limit 50 for the SOF bit follows a sync_seg phase which is provided with the reference symbol 54. This is followed by a transmission phase prop_seg which is provided with the reference symbol 55 in FIG. 7. This is followed by a phase_seg1 which is provided with the reference symbol 56, and a phase_seg2 which is provided with the reference symbol 57. The sequence of the specified phases 54 to 57 is the same for each of the bits.

The user station. 20 samples the reception signal RX-20 at sample points SP1, SP2, SP3, SP4, SP5. The sample points SP1 to SP5 lie between the phase_seg1 provided with the reference symbol 56 and the phase_seg2 provided with the reference symbol 57.

In the case shown in FIG. 7, the CAN clock is in the user stations 10, 20, 30, also referred to as nodes, fRX_node==fTX_node. This means that the reception clock corresponds to the transmission clock. Here, shortening/falsification of the start-of-frame bit (SOF) of "phase_seg2+ε" is sufficient to bring about the problem considered here. In the illustrated case, the fifth sample point SP5 incorrectly results in a recessive value. With 1 Mbit/s and a sample point SP for the sample points SP1, SP2, SP3, SP4, SP5 of 80%, shortening by 205 ns is sufficient in order to generate the problem considered here, as described above.

Figure 8:
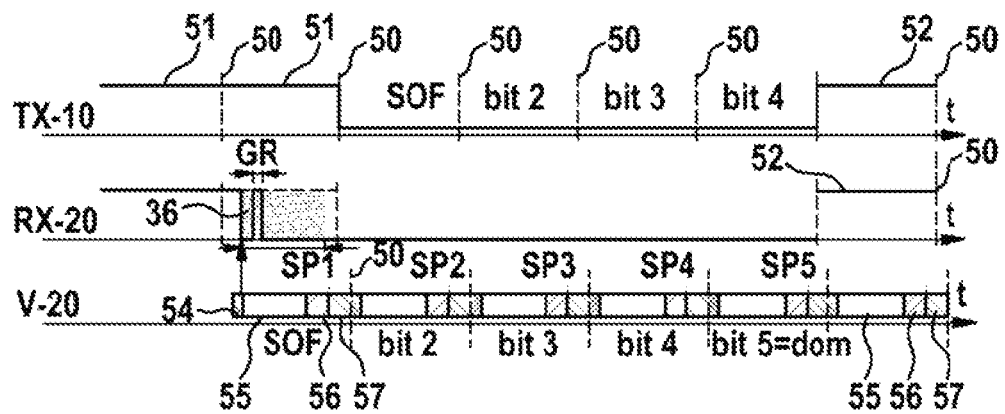

FIG. 8 shows the case in which firstly two idle bits 51 are transmitted in succession on the bus line 3 before the transmission signal TX-10 starts with a dominant start-of-frame bit (SOF bit). This is followed by a bit2 to bit4 with the same level as the start-of-frame bit. The bit 52 which follows the bit4 is transmitted recessively and therefore has another level than the preceding bits.

Accordingly, the reception signal RX-20 in FIG. 8, which corresponds to the transmission signal TX-10, is produced. This reception signal RX-20 can have a dominant level for various reasons (hardware faults, external interference, electromagnetic irradiation etc.) for a time period T (shown by gray hatching in FIG. 8) even though the transmission signal has a recessive level of the idle bit. In the reception signal RX-20 which is falsified in this way, short, recessive interference pulses GR can be additionally present which further falsify the bus signal 36, as shown in FIG. 8. Such interference pulses GR can also arise, for example, owing to external interference, in particular electromagnetic irradiation etc. and are possibly not detected by the receiving user station, that is to say here the user station 20, for example if they are shorter than the smallest bus time unit of one time quantum tq. The reception signal RX-20 remains falsified.

The user station 20 sees the signal V-20 owing to the falsified reception signal RX-20. After the bit limit 50 between the two idle bits 51 there follows the sync_seg phase which is provided with the reference symbol 54. This is followed by the transmission phase prop_seg, which is also provided with the reference symbol 55 in FIG. 8. This is followed by the phase_seg1 provided with the reference symbol 56, and the phase_seg2 provided with the reference symbol 57. The sequence of the specified phases 54 to 57 is the same for each of the bits.

The user station 20 also samples the reception signal RX-20 at sample points SP1, SP2, SP3, SP4, SP5. The sample points SP1 to SP5 are located between the phase_seg1 provided with the reference symbol 56, and the phase_seg2 provided with the reference symbol 57.

In the case illustrated in FIG. 8, the CAN clock is in the user stations 10, 20, 30, also referred as nodes, fRX_node==FTX_node. This means that the reception clock corresponds to the transmission clock. Here, shortening/falsification of the second idle bit 51 before the dominant start-of-frame bit (SOF) of "phase_seg2+ε" is sufficient to bring about the problem considered here. In the illustrated case, the fifth sample point SP5 incorrectly results in a dominant value. With 1 Mbit/s and a sample point SP for the sample points SP1, SP2, SP3, SP4, SF5 of 80%, shortening by 205 ns is again sufficient in order to generate the problem considered here, as described above.

Figure 9:
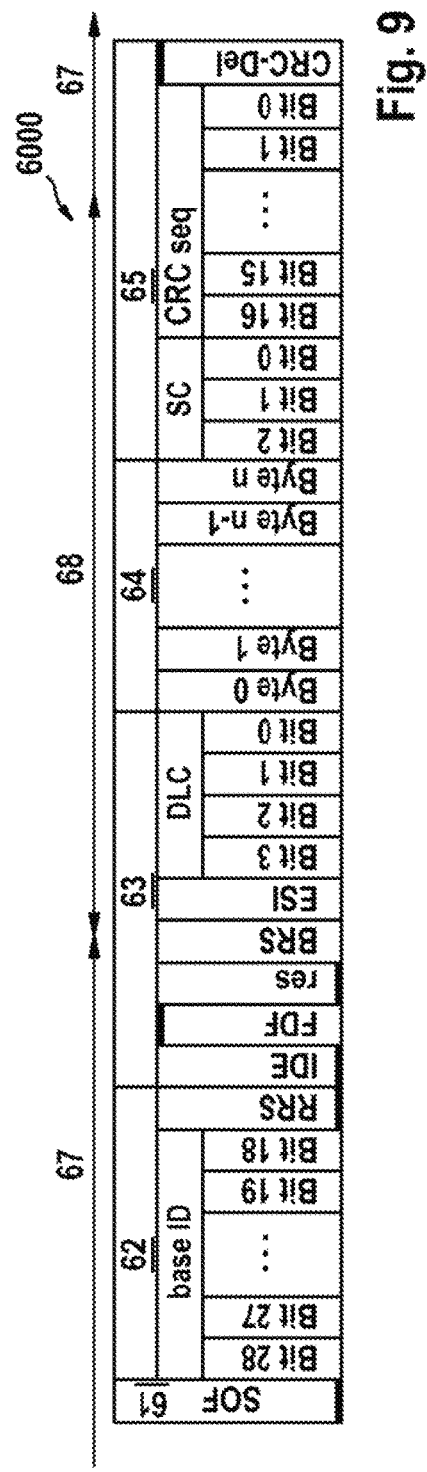
FIG. 9 shows an example of a frame according to the first exemplary embodiment.

FIG. 9 shows as a first exemplary embodiment of the present disclosure a CAN FD frame 6000 with a three-bit wide stuff counting value in an SC field which is arranged at the start of the checksum field 65. Compared to the conventional CAN FD format according to FIG. 3, three stuff counting bits are therefore inserted in the CRC field in the frame 6000. Stuff bits are not illustrated.

Therefore, in the present exemplary embodiment transmitters and receivers of a CAN FD frame with their protection device 12, 22, 32 count the stuff bits 52 which are located before the region in which switching over to the fixed stuff bit method takes place, that is to say the stuff bits 52 before the CRC field or checksum field 65, to solve the problem described above for CRC-17 and CRC-21. The counter reading is also transmitted in the SC field in the transmitted frame 6000, as is shown by FIG. 9. The receiver compares the received counter reading of the field SC with its self-counted number of the stuff bits 52. The fixed stuff bits are not included in the count. If the counter readings differ, this is treated as an CRC error, even if the actual CRC calculation does not exhibit an error.

Because only a hamming distance of 6 is no be ensured, that is to say five errors have to be detected, it is sufficient to use a three-hit counter in the protection device 12, 22, 32. The counter reading which is transmitted in the SC field therefore exhibits the number of the stuff bits in module 8. Therefore, at least 8 errors would be necessary in order to make this 3-bit counter reading (stuff count) undetected and invalid. The 3-bit counter of the protection device 22 can be included in the CRC valuation unit 22A. Of course, a 4-bit counter etc. cart also be used.

According to FIG. 9, in order to transmit the stuff count value or counter reading of the 3-bit counter of the protection device 12, 22, 32 in the frame 6000, the CRC checksum field 65 is extended by three bits at its start. This applies equally well both for the frames 60, 70 with 17-CRC polynomials as well as for the frames 600, 700 with 21-bit polynomials.

Because the three additional bits of the SC field also generate a further fixed stuff bit, the CAN FD frame 6000 is also extended by 4 bits by this method, irrespective of the number of the stuff bits 52, of the DLC field or of the length of the identifier.

The stuff count or stuff count value in CAN FD frame 6000 is also included in the CRC calculation, and it is therefore treated like the data bits.

If a specific bit error as described in the prior art is not discovered by the CRC calculation, this error leads to a situation in which the receiver comes to a different result during the counting of the stuff bits 52 and the error is then detected by comparison of the stuff count, that is to say of the stuff bits 52 counted by the receiver and the number of eth stuff bits 52 arranged in the SC field, and the frame 6000 is rejected as invalid by the receiver.

Alternatively, instead of only the stuff bits 52, all the bits can also be counted in the frame 6000, and alternatively also counter readings can be used which are more than three bits wide. In this method, a stuff bit counting error is treated as a CRC error, and the error frame is therefore transmitted only after the ACK slot. Alternatively, the receiver can also already carry out the comparison after the reception of the last bit of the SC field and transmit an error frame.

According to a second exemplary embodiment, in order to solve the previously described problem for CRC-17 and CRC-21 as an initialization vector of the CRC generator 13A, 23A, 33A it is possible to use the initialization vector "1 . . . 0" instead of "0 . . . 0". Initialization can be performed with the protection devices 12, 22, 32 and in the case of the protection device 22 in particular with the CRC evaluation unit 22A and the insertion unit 22B. As a result, the problems relating to the two critical values of the identifier bits ID28 to ID25 of "0000" and "0001" can no longer occur.

For the problem that a falsified "00000" bit sequence is detected incorrectly if it starts when the intermediate CRC register value is equal to "0 . . . 0", which problem can occur at any bit position between SOF (start-of-frame) and the transmitted CRC checksum, an intermediate CRC register value of "0 . . . 0" for the first 18 transmitted bits cannot occur with the initialization vector of "1 . . . 0".

Otherwise, in the second exemplary embodiment the bus system 1 is constructed in the same way as described in the first exemplary embodiment.

In a third exemplary embodiment, the bus system 1 is stretched in the same way as described in the first exemplary embodiment. However in contrast in the third exemplary embodiment the following two problems are considered with reference to FIG. 10.

Figure 10:
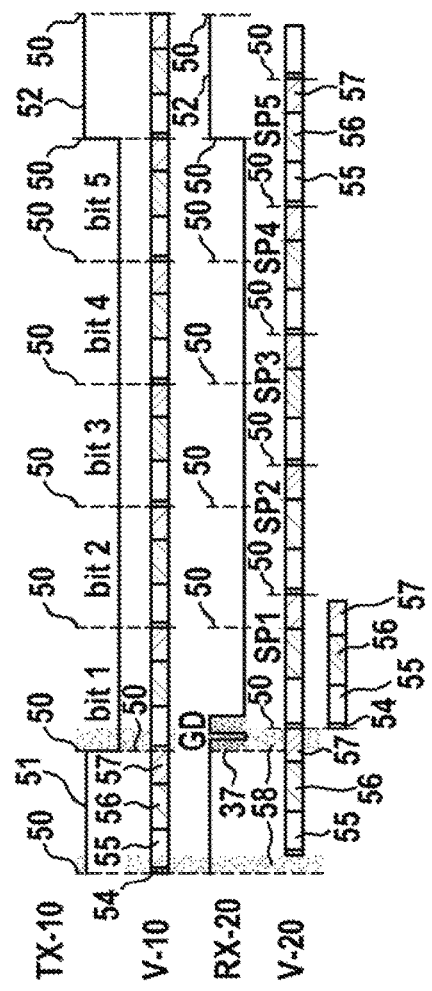
FIG. 10 shows a time profile diagram illustrating the clock ratios between the transmitter and receiver in the interior of a transmitted frame in the bus system.

If in a first case the intermediate CRC register value is equal to "0 . . . 0", while a staggered sequence of "0" is transmitted and the first of these "0" bits is shortened by synchronization, which is caused by noise on the bus, the bit sequence of "00000I" ("I" stands here for a transmitted stuff bit) can then be sampled falsified as "00001" by the receiver, as shown in FIG. 10. The shortening or falsification can again have the specified causes (hardware error, external interference, electromagnetic irradiation, etc.). Dominant interference pulses GD can also have a destructive influence on the synchronization. The signal shifting 58 which is always present as a result of bus transit times is to be considered here. This means that under certain circumstances only four "0" bits instead of five are sampled. This error is not detected by the CRC calculation. FIG. 10 shows, in addition to the signal profiles TX-10, RX-20, V-20 analogously to FIG. 7 and. FIG. 8, also the signal profile T10 which corresponds to the view of the user station 10. According to FIG. 10, after a recessive bit or an idle bit 52 a sequence of five dominant bits, specifically a bit1 to bit5 is transmitted. After this, a stuff bit 52 is inserted.

The case of FIG. 10 can occur if bittimeRX_node>bittimeTX_node applies owing to clock tolerance, wherein node stands for one of the user stations 10, 20, 30 as a transmitter or receiver.

Instead of a correction of the phase error, the noise leads to a situation in which there is no correction of the phase error or even a correction in the wrong direction.

If in a second case the intermediate CRC register value is equal to "0 . . . 0", while a non-staggered sequence "00001" is transmitted and the first of these "0" bits is extended by synchronization, which is in turn caused by noise on the bus, the bit sequence of "00001" can be sampled in a falsified fashion by the receiver as "00000I" ("I" stands here for a transmitted stuff bit). This means that five "0" bits are sampled instead of four. The "1" in this sequence is interpreted as a stuff "1" and is removed. The insertion is not detected by the CRC calculation.

This can occur if bittimeRX_node>bittimeTX_node applies owing to clock tolerance, and only if the sample point position is at an early point. This is also apparent from FIG. 10.

The reverse case reception of the "11111" bit sequence is not a problem for the following reasons. An incoming "1" can change in the CRC into (0 . . . 0). The following "1" gives rise to a CRC which is different from (0 . . . 0) for more than 17 bits. A problem can occur only if the CRC value does not change during this "1" sequence. However, this is not the case.

As a solution to the problem mentioned above it is possible to use the safety devices 12, 22, 32 according to the following possibilities which can be used alternatively or in any desired combination.

a) Extract stuff bits from a CRC calculation as in the case of Classic CAN.

b) Use a fixed stuff bit either in the entire frame or starting with the FDF bit position, which is compatible with Classic CAN frames.

c) Insert an additional virtual bit into the CRC checksum during the calculation.

However, this does not solve the problem that in a specific case it worsens the Hamming distance to 1. If a CRC register reaches a value of "0 . . . 0" in a FD frame, insert a "1" into the CRC logic during an additional evaluation of the CRC mechanism. Do this before the evaluation of the next received/transmitted bit. The inserted "1" can be considered to be a virtue stuff bit which is visible only for the CRC logic, and it changes the critical value from "0 . . . 0" in the CRC register before the next received/transmitted bit is evaluated.

d) Transmit a second CRC sequence within the frame.

e) Transmit the number of stuff bits 52 within the frame (less overhang than in the possibilities b) or d)). An exemplary embodiment of this possibility was described above as a first exemplary embodiment. Further embodiments are given below.

In a formal approach, an error model is, introduced for handling problems, as follows.

Error type A: bit flip. The CRC calculation is a valid method for detecting such an error and makes available the desired. Hamming distance (RD level).

Error type B: (previously specified problems): shortening or lengthening of the bit sequence in conjunction with stuff bits 52. This does not give rise to a frame length error as described above. Shortening or lengthening can occur multiple times per frame 60, 70, 600, 700, 6000. Either shortening or lengthening is possible within one frame 60, 70, 600, 700, 6000 and is determined by means of the relationship between the transmitter clock ratio and receiver clock ratio. In order to detect this error type, the receiver must know the frame length, including the number of stuff bits 52.

It is to be noted in this respect that the CRC result is reliable if the CRC algorithm is provided for precisely the same number of bits (frame length) on the transmitter and receiver sides. Otherwise, that is to say if fewer or more bits are applied to the CRC algorithm in the receiver, it has to be considered to be damaged.

For the following measures for uncovering error types A/B, the current ISO CD 11898-1 (Sep. 11, 2014) forms the starting point. The robustness of the data integrity of CAN FD should be improved compared to classic CAN.

The use of fixed stuff bits (cf. possibility b) above) gives rise to a known number of bits which are expected by the receiver. The frame length is not variable. This is a simple solution but gives rise to a relatively large overhang as a result of which the net bit rate drops by approximately 10% compared to the current ISO CD 11898-1.

According to a fourth exemplary embodiment, in a further solution variant to the problems considered above, information about the number of stuff bits 52 (stuff bit counter, SC) is additionally included in the frame 600, as shown in FIG. 9, and described with respect to the first exemplary embodiment. The information can also be referred to as length information.

The stuff bit counter can be transmitted after changing over from a classic CAN stuff method to a fixed stuff bit method with regularly defined stuff bits. Otherwise, a stuff bit which is inserted into the transmitted stuff bit counter sequence could not be counted in the stuff bit counter.

In addition to this, in the present fourth exemplary embodiment safety monitoring of the length information, that is to say the information about the number of stuff bits 52, is performed in the frame 6000.

If an error type B actually occurs in a frame, the CRC checksum is damaged. If the error type A falsifies the stuff bit counter reading of the safety devices 12, 22, 32 in the same frame, the receiver cannot detect a falsified frame.

This makes it necessary to additionally monitor the reliability of the transmitted length information (stuff bit counting value modulo 8).

Figure 11:
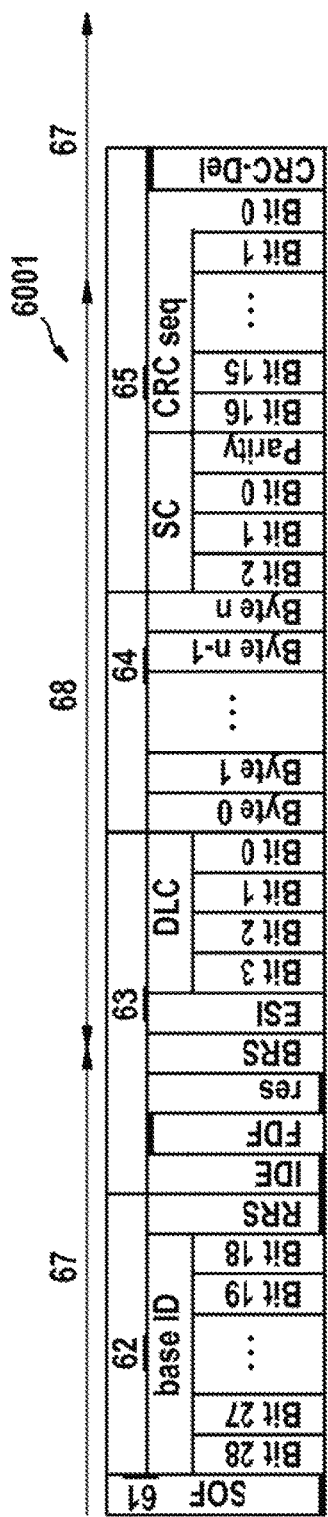
FIG. 11 shows an example of a frame according to a fourth exemplary embodiment.

Therefore, according to FIG. 11 a parity bit is added as protection information into the SC field in a frame 6001, with the result that the parity bit is also transmitted before the checksum field 65. The parity bit is actually the fixed stuff bit which is always inserted. The safety devices 12, 22, 32 change the parity bit depending on whether the CRC checksum is damaged or not. As a result a damaged frame 6001 can be reliably detected even when the error types A and B occur simultaneously.

Figure 12:
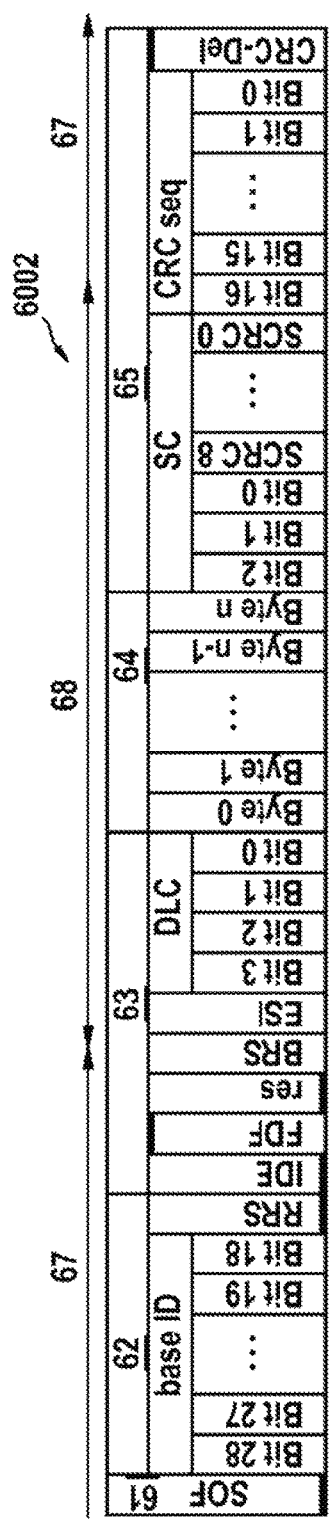
FIG. 12 shows an example of a frame according to a fifth exemplary embodiment.

According to a fifth exemplary embodiment, in a further solution variant further information, specifically separate CRC checksums for the content of the stuff bit counter, are calculated and included as protection information e.g. for a 9-bit CRC as bits SCRC8 to SCRC0 in a frame 6002, as is shown in FIG. 12. A possible CRC checksum with 9 bits is the known DARC-8 CRC with the generator polynomial $x^8+x^5+x^4+x^3+1$. it is also possible to use a 5-bit CRC checksum with somewhat less protection (Hamming distance HD). The values of the checksum which are determined by means of the generator polynomial over the counting value of the stuff bits are contained in the frame 6002. In this way, it is also possible to detect reliably a damaged frame 6002, for example given simultaneous occurrence of the error types A and B.

The following table 3 shows an overview of the various solutions described above. The total length of the CRC field is obtained from the length of the CRC, the length of the stuff bit counter, the length of the additional protection information and the number of inserted fixed stuff bits. "SC" stands for stuff bit counter, and "f.s." stands for fixed stuff bits.

TABLE 3

| So-lu-tion No. | Length of CRC field: SC + safety monitoring + f.s. | Description | Safety evaluation | Comments |
|---|---|---|---|---|
| 1 | 17 + 3 + 0 + 6<br>21 + 3 + 0 + 7 | | Safety monitoring only by frame CRC | Smallest overhang |
| 2 | 17 + 3 + 1 + 6<br>21 + 3 + 1 + 7 | Stuff bit counting value gray coded with parity bit at LSB, invert following fixed stuff bit with respect to parity bit | HD3 + 1 error in frame = HD4 | Better than classic CAN |
| 3 | 17 + 3 + 5 + 7<br>21 + 3 + 5 + 8 | | HD4 + 1 error in frame = HD5 | |
| 4 | 17 + 3 + 9 + 8<br>21 + 3 + 9 + 9 | DARC-8 CRC $x^8 + x^5 + x^4 + x^3 + 1$ | HD5 + 1 error in frame = HD6 | DLC could also be included in this CRC since it monitors up to 9 bits for safety |

Here, the solution number 1 in the table 3 corresponds to the first exemplary embodiment. The solution number 2 in the table 3 corresponds to the fourth exemplary embodiment. The solution number 3 in the table 3 corresponds to a variant of the fifth exemplary embodiment with 5-bit CRC. The solution number 4 in the table 3 corresponds to the further variant of the fifth exemplary embodiment with 9-bit CRC.

All the refinements of the bus system 1, of the user stations 10, 20, 30 and of the method which are described above can be used individually or in all possible combinations. In particular, all the features of the exemplary embodiments described above can be combined as desired or omitted. In addition, in particular the following modifications are conceivable.

The bus system 1, described above, according to the exemplary embodiments is described on the basis of a bus system which is based on the CAN FD protocol. However, the bus system 1 according to the exemplary embodiments can also be some other type of communication network. It is advantageous, but not a necessary precondition, that in the case of the bus system 1 exclusive collision-free access is ensured to a user station 10, 20, 30 on a common channel at least for specific time periods.

The number and arrangement of the user stations 10 to 30 in the bus system 1 of the exemplary embodiments and their modifications is arbitrary. In particular, only user stations 10 or 20 or 30 can also be present in the bus system 1. Any desired combinations of the user stations 10 to 30 are also possible in the bus systems 1.

Instead of the embodiment shown for them in FIG. 1, the protection devices 12, 22, 32 can each also be provided in the associated communication control device 11, 21, 31. One or more such user stations can be present in any desired combination with the user stations 10, 20, 30 in the bus system 1, as an alternative to or in addition to the user stations 10, 20, 30.

The invention claimed is:

1. A method for serially transmitting frames, the method comprising:
   transmitting a frame from the from a transmitter to a receiver via a bus line;
   inserting, before the transmitting, stuff bits configured to generate additional signal edges into the frame with the transmitter, as a function of values of a plurality of preceding bits;
   counting, with the transmitter the stuff bits which are inserted as a function of the values of the plurality of preceding bits in the frame; and
   transmitting, with the transmitter, a number of stuff bits counted by the transmitter in the frame.

2. The method as claimed in claim 1, further comprising:
   transmitting, with the transmitter, protection information relating to the number of stuff bits counted by the transmitter in the frame.

3. The method as claimed in claim 1, further comprising:
   counting, with the receiver, the stuff bits in the frame as a function of the values of the plurality of preceding bits in the frame;
   comparing, with the receiver, a number of stuff bits counted by the receiver with the number of stuff bits counted by the transmitter, and
   rejecting, with the receiver, the frame in response to the number stuff bits counted by the receiver being unequal to the number of stuff bits counted by the transmitter.

4. The method as claimed in claim 1, further comprising:
   inserting, stuff bits in a first part of the frame as a function of the values of the plurality of preceding bits;
   inserting, stuff bits in a second part of the frame as fixed stuff bits at defined positions;
   counting, with the transmitter, stuff bits the are located before the defined positions at which the fixed stuff bits are placed; and
   transmitting, with the transmitter, a number of stuff bits located before the defined positions counted by the transmitter is also transmitted in the transmitted frame.

5. The method as claimed in claim 1, wherein:
   the frame has a header part, a data part and an end part, the header part including an identifier,
   the frame has a CRC checksum, and
   the method further comprises transmitting the number of stuff bits counted by the transmitter in the end part of the frame before the CRC checksum.

6. The method as claimed in claim 5, including the number of stuff bits counted by the transmitter in a calculation of the CRC checksum.

7. The method as claimed in claim 5,
   inserting a fixed stuff bit between the number of stuff bits counted by the transmitter and the CRC checksum, the fixed stuff bit containing, as a parity bit, protection information about the number of stuff bits counted by the transmitter.

8. The method as claimed in claim 1, wherein a 3-bit counter is used for the counting of the stuff bits by the transmitter.

9. A user station for a bus system, the user station comprising:
   a transceiver device configured to at least one of (i) transmit a frame to and (ii) receive the frame from one other user station of the bus system via a bus line; and
   a protection device configured to protect a number of stuff bits which are inserted into the frame,
   wherein the transceiver device is configured to at least one of (i) insert into frame, before transmitting the frame, the stuff bits, according to a predetermined rule for generating additional signal edges, as a function of values of a plurality of preceding bits, and (ii) remove the stuff bits from the frame when evaluating the received frame, and wherein the protection device is configured to (i) count the stuff bits that are inserted as a function of the values of the plurality of preceding bits and to (ii) insert the number of stuff bits counted by the protection device into the frame before the frame is transmitted.

10. A bus system having a bus line; and at least two user stations configured to be connected to one another via the bus line such that they can communicate with one another, at least one of the at least two user stations comprising a transceiver device configured to at least one of (i) transmit a frame to and (ii) receive the frame from one other user station of the bus system via a bus line; and a protection device configured to protect a number of stuff bits which are inserted into the frame, wherein the transceiver device is configured to at least one of (i) insert into frame, before transmitting the frame, the stuff bits, according to a predetermined rule for generating additional signal edges, as a function of values of a plurality of preceding bits, and (ii) remove the stuff bits from the frame when evaluating the received frame, and wherein the protection device is configured to (i) count the stuff bits that are inserted as a function of the values of the plurality of preceding bits and to (ii) insert the number of stuff bits counted by the protection device into the frame before the frame is transmitted.

* * * * *